United States Patent [19]
Reichert et al.

[11] Patent Number: 5,487,964
[45] Date of Patent: Jan. 30, 1996

[54] POWDER MIXTURES FOR METALLIZATION OF SUBSTRATE SURFACES

[75] Inventors: Günther Reichert, Köln; Hans Lietz, Odenthal; Jürgen-Rolf Hassdenteufel, Bergisch Gladbach; Günter Sackmann; Frank Kobelka, both of Leverkusen, all of Germany

[73] Assignee: Bayer Aktiengesellschaft, Leverkusen, Germany

[21] Appl. No.: 255,506

[22] Filed: Jun. 8, 1994

[30] Foreign Application Priority Data

Jun. 15, 1993 [DE] Germany .......................... 43 19 759.0

[51] Int. Cl.⁶ .................................................. C23C 18/30
[52] U.S. Cl. ........................ 430/16; 106/1.11; 427/304; 427/443.1
[58] Field of Search ............................ 430/16; 106/1.11; 427/443.1, 304

[56] References Cited

U.S. PATENT DOCUMENTS

| | | | |
|---|---|---|---|
| 3,560,257 | 2/1971 | Schneble, Jr. et al. | 117/212 |
| 4,017,265 | 4/1977 | Taylor | 428/675 |
| 4,493,861 | 1/1985 | Sirinyan et al. | 427/304 |
| 4,504,529 | 3/1985 | Sorensen | 430/16 |
| 4,764,401 | 8/1988 | Sirinyan et al. | 427/304 |
| 5,182,135 | 1/1993 | Giesecke et al. | 427/98 |
| 5,200,272 | 4/1993 | Sirinyan et al. | 428/458 |
| 5,296,020 | 3/1994 | Reichert et al. | 106/1.11 |
| 5,300,140 | 4/1994 | Wolf et al. | 106/1.11 |

FOREIGN PATENT DOCUMENTS

| | | |
|---|---|---|
| 0081129 | 6/1983 | European Pat. Off. . |
| 0503351 | 9/1992 | European Pat. Off. . |
| 0508265 | 10/1992 | European Pat. Off. . |
| 3627256 | 2/1988 | Germany . |
| 3814506 | 11/1989 | Germany . |
| 4036591 | 5/1992 | Germany . |
| 4107644 | 9/1992 | Germany . |
| 4111817 | 10/1992 | Germany . |

OTHER PUBLICATIONS

Specification of U.S. Ser. No. 788,957, filed on Nov. 7, 1991, for "Primer for the Metallisation of Substrate Surfaces", pp. 1–21+abstract page.

*Primary Examiner*—John Goodrow
*Attorney, Agent, or Firm*—William C. Gerstenzang; Sprung Horn Kramer & Woods

[57] ABSTRACT

New spray powder formulations are described which, after application in the form of a thin layer to substrate surfaces with the aid of processes basset on electrostatic attraction and storing of this layer by heat or high-energy radiation, allow the deposition of firmly adhering layers of metal by currentless, wet-chemical metallization. The essential constituents of such a formulation are a pulverulent, non-conductive material and (semi-) noble metal compounds.

13 Claims, No Drawings

POWDER MIXTURES FOR METALLIZATION OF SUBSTRATE SURFACES

BACKGROUND OF THE INVENTION

1. Field of the Invention

The invention relates to formulations based on powders which comprise a non-conductive material and activators and if appropriate pigments and charge control agents.

These formulations are used for pretreatment of substrate surfaces, for example surfaces of plastics, with the aim of subsequent metallization in currentless metallization baths.

The metallized surfaces of plastics are employed for the purpose of shielding from electromagnetic waves, as a light barrier, as a structured metal surface for conductor tracks for electrical circuits, as a dot and dash code for data processing, for permanently writing data to CD discs, as electrical switches, for tablet blisters and packagings and other similar purposes.

2. Description of the Related Art

It is known that polymeric materials must be pretreated before chemical and subsequent electrometallization in order to achieve adequate adhesion of the layer of metal to the surface of the material. The pretreatment is mainly carried out by etching the polymer surface with environmentally polluting chromic/sulphuric acids. However, working with chromic/sulphuric acid, $SO_3$ vapour or other oxidizing agents is accompanied by a deterioration in the physical properties, such as the impact strength and electrical surface resistance, of the polymeric material. Trouble is furthermore often caused by traces of 6-valent chromium, which can rapidly lead to poisoning of the metal baths.

The known processes for currentless metallization of materials furthermore comprise several process stages and have the disadvantage that they cannot be used directly on all polymers. Chemical swelling or physical roughening often additionally has to be carried out.

It has therefore already been proposed to activate the polymer surfaces with organometallic catalysts under very mild conditions (US 3 560 257 and EP-A 81 129). However, this progressive method is also not universally applicable. Moreover, the use of solvents often leads to the start of stress corrosion cracking of the polymeric injection-moulded component under tensile or compressive stress.

Other processes, such as are described in U.S. Pat. Nos. 3,560,257 and 4,017,265 and also DE-A 3 627 256, have the disadvantage that they require relatively large amounts of expensive noble metal activators.

Specific adhesion-promoting coatings of plastic furthermore are known from DE-A 3 814 506. However, these have to be activated in activation baths before their metallization, which can lead to geometry-related foreign deposition in cases of partial metallization.

Finally, DE-A 40 36 591 describes an economical, universally applicable process for chemical metallization in which, without prior etching with oxidizing agents, surfaces of materials based on glasses, metals and, in particular, plastics can be provided with a firmly adhering metal coating deposited by a wet-chemical route. The process comprises coating substrate surfaces with a specific primer based on a polymeric organic film or matrix-forming agent, which also additionally contains an additive, metallization activators, fillers and solvent, and subsequently metallizing the surfaces with a firmly adhering deposit.

The disadvantage of the process mentioned last is that the primer described necessarily contains organic solvents. However, solvent-containing paints are more and more under pressure for environmental reasons. Furthermore, it has proved to be a disadvantage that a relatively dense spray mist is formed when the primer described above is sprayed onto substrate surfaces.

DE-A 41 07 644 furthermore describes a process for chemical metallization in which substrate surfaces are coated with a hydroprimer which comprises an aqueous dispersion of a polymeric film-forming agent, metallization activators and if appropriate filler. After drying, the substrate surfaces coated with this hydroprimer can be provided with metal coatings in metallization baths.

The disadvantage of the process mentioned last is that aqueous formulations are employed, and if water-soluble activators are used, there is the danger that the metallization baths will be contaminated with the activator dissolved out of the coating, and residual water contents have to be removed from the coating. The activator of the coating furthermore must be brought into an active form by preliminary reduction, for example with dimethylaminoborane (DMAB), in an additional step in order to gene, rate uniform layer thicknesses of the metal deposit in the subsequent metallization step.

Finally, DE-A 41 11 817 describes another economical process for chemical metallization in which substrate surfaces likewise are coated with an aqueous dispersion of a specific polyurethane, the metallization activators added being present quantitatively in water-insoluble and active form. This means that contamination of the metallization baths is avoided and uniform metal layer thicknesses are produced on the substrate surface.

One disadvantage of this formulation is that the residual water of the coating must be removed.

SUMMARY OF THE INVENTION

The object of the present invention was therefore to develop a process for chemical metallization of surfaces of materials based on plastics and mineral substances, with which firmly adhering flat or structured metal coatings deposited by a wet-chemical route can be applied to the substrates without prior etching with oxidizing agents and without solvents, solvents being avoided completely.

The object is achieved by coating substrate surfaces triboelectrically or by means of electrophotographic processes with a powder mixture of a non-conductive material and metallization catalysts and if appropriate pigments, such as carbon blacks, and charge control agents.

The invention accordingly relates to spray powder formulations which, after application to substrate surfaces in the form of a thin layer and stoving of this layer by heat treatment or by high-energy radiation, allow deposition of firmly adhering layers of metal by currentless, wet-chemical metallization, which are characterized in that the spray powder formulation comprises, as essential constituents, a pulverulent, non-conductive material and a (semi-)noble metal compound in an amount of 0.1–1.0% by weight, based on the powder formulation and calculated as the metal.

DETAILED DESCRIPTION OF THE INVENTION

The powder formulation is stoved into the substrate surface by heat treatment or by means of high-energy radiation and then provided with metal coatings in a firmly adhering manner in a chemical metallization bath.

The process according to the invention has the great advantage that it requires no solvent and is thus environment-friendly.

The advantage of powder formulations, which can be applied by triboelectric charging, is the reduction of losses by overspray and avoiding of problems like emission and toxically problems (agyrie).

Known water-based formulations with noble metal activators, for example, $Ag_2SO_4$, need therefore a greater technical expenditure.

It should be mentioned, that the activity of the activator in powder formulations is constant in opposite to water-based formulations, in which the activator is often absorbed by components within the formulation and suffers from loss of activity. This means problems of the procedure and quality of subsequent metal layers.

Another advantage is that, by the omission of solvent, coatings which are produced by imaging a master can be obtained by triboelectric charging of the substrate surface or of the spray powder, for example with or without a mask or by means of a transfer process, such as exists in electrophotographic processes, all based on electrostatic attraction.

After the layer which has been applied, for example, by means of a mask has been stoved by heat treatment or direct fixing by means of high-energy radiation, conductor tracks and metallized dash and dot codes can be produced after metallization in chemical metallization baths.

Possible activators in the powder mixtures according to the invention are (semi-)noble metal compounds, above all organometallic compounds of the first and eighth sub-group of the Periodic Table (in particular of Pd, Pt, Au and Ag), such as are described, for example, in EP-A 34 485, 81 438 and 131 198. Particularly suitable activators are the organometallic complex compounds of palladium with olefins (dienes), with $\alpha,\beta$-unsaturated carbonyl compounds, with crown ethers, with nitriles and with diketones, such as pentanedione.

Ionic metals in the form of salts, such as halides, carboxylates, sulphonates, nitrates, carbonates, sulphates, sulphides and hydroxides, are also suitable. The salts of Pd, Pt, Au and Ag, for example $Na_2PdCl_4$, $Na_2PdCN_4$ and $AgNO_3$, and also PdS and $Ag_2S$, are preferred.

Good results are achieved with those compounds which can be mixed readily with the powder formulation, for example with bis-acetonitrile-palladium dichloride.

Zero-valent complex compounds, such as palladium(0) tetrakis-(triphenylphosphine), are also suitable.

The silver diamine complex $[Ag(NH_3)_2]^+$ or silver salts, such as $Ag_2SO_4$, $AgNO_3$, Ag acetate or $AgMnO_4$, are similarly suitable.

Generally, mixtures of such compounds can also be employed.

The amount of the (semi-)noble metal can be varied in the range from 0.1 to 10% by weight, based on the spray powder formulation. The preferred amount of noble metal is from 0.2 to 8% by weight, especially preferably from 0.25 to 5% by weight.

The powder formulation comprises mixtures of the non-conductive material, pigments, such as carbon black and/or other inorganic or organic pigments in amounts of 5–20% by weight, preferably 10–15% by weight, based on the non-conductive material, and if appropriate charge control agents, for example quaternary ammonium salts and others known to the expert, in amounts of 0–5% by weight, based on the non-conductive material.

The non-conductive material furthermore can comprise fillers in an amount of 0–70% by weight, preferably 5–35% by weight, based on the non-conductive material.

The non-conductive material comprises (co)polymers of the group comprising (meth)acrylates, polyesters, epoxide-polyesters, epoxy resins, polyurethanes, polyolefins, such as polyethylenes or polypropylenes, polyvinyl chloride, polyamides, cellulose esters, (chlorinated) polyethers, ethylene/vinyl acetate copolymers or a mixture of several of them, preferably a styrene/(meth)acrylate or a polyester, particularly preferably a styrene/n-butyl methacrylate, a styrene/n-butyl acrylate, a styrene/ethylhexyl acrylate or a polyester of terephthalic acid or isophthalic acid and 4,4'-dihydroxydiphenyl-2,2-propane, hexanediol or neopentylglycol.

The polymer represents the remainder to make up to 100% by weight of the non-conductive material.

The pulverulent non-conductive material has a particle size of from 5 to 90 µm, preferably from 5 to 50 µm, particularly preferably from 10 to 40 µm.

The formulations according to the invention are in general prepared by mixing the constituents.

Units such as ball or bead mills can be employed to achieve a particularly homogeneous distribution.

The powder formulation can be applied to the substrate surfaces by dipping, painting, brushing and spraying.

Surfaces can be activated in a fiat or structured manner for subsequent chemical metallization in particular by spraying the powder formulations according to the invention onto triboelectrically charged plastics or by transfer such as is carried out in electrophotographic processes based on electrostatic attraction. Positive or negative structures/patterns can be produced in this manner.

The layer thickness of the powder formulation applied can be very thin. It is chiefly in the range from 1 to 100 µm, preferably in the range from 2 to 15 µm.

In this connection, it may be mentioned that a swelling or superficially etching pretreatment of substrates of plastics is not necessary when the powder formulations according to the invention are employed.

Triboelectric charging on the parts of the component of plastic which are to be coated or of the powder is sufficient to achieve suitable powder layer thicknesses.

Suitable substrates for the process according to the invention are workpieces based on, for example, inorganic glasses, mica and, in particular, plastics. Plastics such as are employed in the electrical, electronics and domestic sectors are particularly preferred. In this connection, reference may be made to plastics which can be charged triboelectrically and electrostatically particularly easily or have no antistatic finish.

Plastics which may be mentioned are ABS, polycarbonate and blends thereof. Other examples of plastics are: polyamides, polyester types, PVC, polyethylene, polypropylene, polyphenyl sulphide, polyphenylene oxide and polyurethanes.

After application of the powder formulations according to the invention to the surface of the substrates, the powder layer is stoved at substrate-specific temperatures between the glass, transition temperature and 200° C. under normal pressure.

The stoving time can be 20–120 minutes, preferably 30–90 minutes.

The surfaces thus treated as a role do not have to be further sensitized; they can be employed directly for currentless metallization. Cleaning after stoving of the powder layer is no longer necessary.

One embodiment of the process according to the invention comprises carrying out the reduction in the metallization bath directly with the reducing agent of the currentless metallization.

The process comprises 3 operations: —application of the powder layer to the substrate via electrostatic charging, —stoving of the powder layer by heat treatment or high-energy radiation, —metallization.

Preferred metallization baths which can be employed in the process according to the invention are those from which chromium, iron, nickel, cobalt, copper, gold or silver and their mixtures with one another can be deposited. The metals can then be oxidized in order in addition to obtain further magnetic properties of the oxides for information storage (magnetic or magnetooptical processes).

The process has the advantage that it manages entirely without solvents. Materials metallized by the new process are distinguished by good shielding from electromagnetic waves.

On the other hand, conductor tracks on plastics which can be employed for the electrical and electronics industry can also be produced directly by the new process by means of a mask. Conductor tracks can also be produced directly by means of high-energy radiation after fixing after the metallization.

Furthermore, by means of a modified photocopying apparatus, structures such as, for example, conductor tracks and dash and dot codes can be imaged, transferred to substrates and, after fixing by heat treatment or high-energy radiation after metallization, conductor tracks or metallized codes can be produced.

Furthermore fibres or threads can also be treated with the powder formulations for subsequent metallization in a metallization bath.

In the form of textiles, woven fabrics or knitted fabrics, they can be used for electromagnetic shielding, fulfil a decorative function or be employed for locating persons requiring sea or mountain rescue; reflection and other metallic properties are utilized here.

Surfaces which are copperized by means of the process described furthermore can be protected from (micro)organisms which are sensitive to copper.

Rigid and flexible rods or cables likewise can be treated with the powder formulations.

Metallized rods or cable, can be employed in electrical engineering as coaxial cables or as electrical conductors.

Plastics, for example containers of plastic, furthermore can be finished with a metal deposit in order to carry off electrostatic charges.

Furthermore, as an alternative to the CD techniques used to date, powder applied to CD blanks can be stoved with a writing apparatus and controlled laser pulses.

The stoved areas can be metallized with various metals. The CD disc is then covered with a (black) protective lacquer.

Information can be fixed on the basis of the differences in the reflection of the metallized and non-metallized areas and can be read again in a modified CD player.

Conductor tracks furthermore can be applied to the top films of blisters for tablets by means of the powder after metallization, and, after the pack has been pushed through and a tablet removed, these indicate the removal of the tablet by the interruption of a circuit applied to the tracks.

In the clinical sector in particular, the taking of tablets by patients can be monitored and recorded in this manner.

EXAMPLE 1

A polyester film (50×100 mm) is cleaned with ethanol and provided with the activator powder formulation by spraying. Excess powder can easily be removed by shaking the coated film. The film is then heated at 100° C. for 10 minutes and subsequently cooled to room temperature. The layer of powder attached to the moulding provides a flat cover and is of thin layer thickness.

The activator powder formulation comprised:

| 4 parts by weight of | bis-acetonitrile-palladium dichloride |
| 20 parts by weight of | powder formulation comprising |
| 90% by weight of | a polyester of terephthalic acid and 4,4'-dihydroxydiphenyl-2,2-propane having a molecular weight in the range from $M_w = 5,000$ to $50,000$ and a particle size of from 5 to 40μ and |
| 10% by weight of | carbon black. |

The coated film was immersed for 10 minutes at a metallization bath temperature of 23° C. in a commercially available metallization bath with the following concentrations: Cu=3.3 g/l, sodium hydroxide=5.4 g/l and formaldehyde=9.2 g/l, which was also employed in the following examples. The copper was deposited uniformly in a flat cover.

Thereafter, the coated film was removed from the metal bath, rinsed thoroughly with demineralized water and after-heated at 100° C. for 10 minutes.

The metal deposit adhered uniformly well to the surface of plastic. The tape test according to DIN 53 151 was passed.

EXAMPLE 2

The activator powder formulation in Example 1 is employed as toner in a modified photocopying apparatus which operates by the electrophotographic process based on electrostatic attraction. A film of polyester (polyethylene terephthalate) is inserted as the substrate.

A pattern of black lines serves as the master which is to be photocopied. After the photocopying operation has been started and ended, the corresponding image is obtained as a coating on the film employed.

The film can be after-heated in an oven at 100° C. for 10 minutes and then, after cooling, metallized as in Example 1. Metallized lines are formed. The film is then rinsed thoroughly with water and after-heated at 100° C. for 10 minutes.

The linear metal strips adhere well. The test film test according to DIN 53 151 is passed. The electrical resistance is 0.5 Ω/8 cm.

The film is a constituent of a tablet blister. By tearing the film, the metal strip lying over the tablet or the conductor track is interrupted. By interruption of a circuit which has been applied, the removal of a tablet can be recorded.

What is claimed is:

1. A spray powder formulation for direct application to substrate surfaces or for application to substrate surfaces by electrophotographic processes in the form of a thin layer, and stoving of said thin layer by heat treatment or by high-energy radiation, deposition of firmly adhering layers of metal by currentless, wet-chemical metallization, comprising a pulverulent, non-conductive material and a (semi-) noble metal compound in an amount of 0.1–10% by weight, based on the total weight of powder formulation and calculated as the metal, wherein said pulverulent non-conductive material has a size of 5–90 μm and is a mixture comprising (a) a polymer selected from the group consisting of (meth)acrylate, polyester, epoxide-polyester, epoxy resin, polyurethane, polyethylene, polypropylene and other polyolefins, polyvinyl chloride, polyamide, cellulose ester, (chlorinated) polyether, ethylene/vinyl acetate copolymer and mixtures thereof;

(b) a pigment in an amount of 5–20%, (c) fillers in an amount of 0–70%, (d) charge control agents in an amount of 0–5% by weight, and wherein said (semi-) noble metal compound is selected from the group consisting of complex compounds or inorganic salts of the elements Cu, Au, Ag, Pt, Pd and Ru in amounts of from 0.2 to 8 by weight, all the percentage data being based on the powder formulation and the polymer representing the remainder to make up to 100% by weight, of pulverulent non-conductive material.

2. The spray powder formulation of claim 1, which comprises complex compounds or inorganic salts of the elements Cu, Au, Ag, Pt, Pd or Ru in amounts of between 0.25–5% by weight, based on the amount of powder formulation and calculated as the metal, as the (semi-)noble metal compound.

3. The spray powder formulation of claim 1, which comprises bis-acetonitrile-palladium dichloride or palladium(0)-tetrakis-(triphenylphosphine) or the silver diamine complex $[Ag(NH_3)_2]^+$ or silver salts, as the metal complex.

4. The spray powder formulation of claim 3, which comprises $Ag_2SO_4$, $AgNO_3$, Ag acetate or $AgMnO_4$, as the silver salt.

5. The spray powder formulation of claim 1, wherein the pigment b) is present in 10–15% by weight, based on the powder formulation.

6. The spray powder formulation of claim 1, wherein the fillers c) are present in 5–35% by weight, based on the powder formulation.

7. The spray powder formulation of claim 1, which comprises a styrene/(meth)acrylate or a polyester, particularly preferably a styrene/n-butyl methacrylate, a styrene/n-butyl acrylate, a styrene/ethylhexyl acrylate or a polyester of terephthalic acid or isophthalic acid and 4,4'-dihydroxydiphenyl-2,2-propane, hexandiol or neopentylglycol, as the (co)polymer.

8. The spray powder formulation of claim 1, which comprises carbon black, inorganic or organic pigments or a mixture of several of these, as the pigment.

9. The spray powder formulation of claim 1, which comprises a quaternary ammonium salt, as the charge control agent.

10. The spray powder formulation of claim 1, wherein the pulverulent, non-conductive material has a particle size of 5–50 μm.

11. The spray powder formulation of claim 14, wherein the pulverulent, non-conductive material has a particle size of 10–40 μm.

12. A process for activation of substrate surfaces for currentless metallization thereof or for the production of conductor tracks on surfaces of plastics which are produced by currentless metallization after imaging of a master by means of electrophotographic processes based on electrostatic attraction, wherein these surfaces are treated with a formulation according to claim 1.

13. The process of claim 12, wherein the process products comprise metallized shaped articles or films for shielding electromagnetic waves, circuits by means of masks or electrophotographic processes based on electrostatic attraction, switch mats or film keyboards, dot and dash codes for data processing, for permanent writing of data onto CD discs, electrical switches for tablet blister packs, light barriers, for carrying away an electrostatic charge and protection against microorganisms.

* * * * *

UNITED STATES PATENT AND TRADEMARK OFFICE
CERTIFICATE OF CORRECTION

PATENT NO. : 5,487,964
DATED : January 30, 1996
INVENTOR(S) : Reichert, et al.

It is certified that error appears in the above-indentified patent and that said Letters Patent is hereby corrected as shown below:

Title Page      ABSTRACT: Line 4 delete " storing " and substitute -- stoving --

Col. 8, line 21    Delete claim " 14 " and substitute claim -- 10 --

Signed and Sealed this

Eighteenth Day of June, 1996

Attest:

BRUCE LEHMAN

*Attesting Officer*      *Commissioner of Patents and Trademarks*